United States Patent
Hong et al.

(10) Patent No.: US 10,062,006 B2
(45) Date of Patent: Aug. 28, 2018

(54) IMAGE SENSING APPARATUS, OBJECT DETECTING METHOD THEREOF AND NON-TRANSITORY COMPUTER READABLE RECORDING MEDIUM

(71) Applicant: SAMSUNG ELECTRONICS CO., LTD., Suwon-si (KR)

(72) Inventors: Jin-hyuk Hong, Seoul (KR); Young-kwang Seo, Suwon-si (KR); Eun-seok Choi, Suwon-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/171,061

(22) Filed: Jun. 2, 2016

(65) Prior Publication Data

US 2017/0024631 A1 Jan. 26, 2017

(30) Foreign Application Priority Data

Jul. 24, 2015 (KR) .................. 10-2015-0105201

(51) Int. Cl.
*G06T 7/20* (2017.01)
*G06K 9/62* (2006.01)
(Continued)

(52) U.S. Cl.
CPC ............ *G06K 9/6215* (2013.01); *G06T 7/194* (2017.01); *G06T 7/254* (2017.01);
(Continued)

(58) Field of Classification Search
CPC ................. G06T 7/254; G06T 7/194; G06T 2207/30232; G06T 2207/30196;
(Continued)

(56) References Cited

U.S. PATENT DOCUMENTS 5,657,076 A * 8/1997 Tapp ................. G08B 13/19645
348/154
6,570,608 B1 5/2003 Tserng
(Continued)

FOREIGN PATENT DOCUMENTS

| EP | 1115254 A2 | 7/2001 |
|---|---|---|
| JP | 20018189 A | 1/2001 |
| JP | 2002150295 A | 5/2002 |

OTHER PUBLICATIONS

Communication dated Dec. 12, 2016, issued by the European Patent Office in counterpart European Application No. 16170708.8.
Communication dated Feb. 9, 2017, issued by the European Patent Office in counterpart European Application No. 16170708.8.

*Primary Examiner* — Geoffrey E Summers
(74) *Attorney, Agent, or Firm* — Sughrue Mion, PLLC

(57) ABSTRACT

An apparatus and a method of detecting an object of the apparatus are provided. The apparatus includes a sensing part configured to photograph an image, a storage configured to store a background image frame, and a controller configured to obtain a first difference image and a second difference image from the photographed image and to determine an existence and a position of an object using the first and the second difference images, wherein the first difference image is an image indicating a difference between a currently photographed image frame and a previously photographed image frame, and the second difference image is an image indicating a difference between the currently photographed image frame and the background image frame stored in the storage.

17 Claims, 8 Drawing Sheets

(51) Int. Cl.
*G08B 13/196* (2006.01)
*G06T 7/254* (2017.01)
*G06T 7/194* (2017.01)
*G08B 25/08* (2006.01)

(52) U.S. Cl.
CPC ....... *G08B 13/19602* (2013.01); *G08B 25/08* (2013.01); *G06K 2209/21* (2013.01); *G06T 2207/10016* (2013.01); *G06T 2207/20081* (2013.01); *G06T 2207/30196* (2013.01); *G06T 2207/30232* (2013.01)

(58) Field of Classification Search
CPC ........... G06T 2207/10016; G06T 2207/20081; G08B 13/19602; G08B 25/08; G06K 9/6215; G06K 2209/21
USPC ......................................................... 382/103
See application file for complete search history.

(56) References Cited

U.S. PATENT DOCUMENTS

| | | |
|---|---|---|
| 2004/0057600 A1 | 3/2004 | Niwa |
| 2004/0141633 A1 | 7/2004 | Horie |
| 2007/0195993 A1* | 8/2007 | Chen ...................... H04N 19/60 382/103 |
| 2008/0056534 A1 | 3/2008 | Kigasawa |
| 2010/0246968 A1 | 9/2010 | Hoshino et al. |
| 2012/0162416 A1* | 6/2012 | Su .......................... H04N 7/185 348/143 |
| 2014/0105498 A1* | 4/2014 | Sethuraman ............ G06T 7/254 382/180 |
| 2015/0003675 A1* | 1/2015 | Nakagami .......... G06K 9/00523 382/103 |
| 2015/0139484 A1* | 5/2015 | Wu .................... G06K 9/00624 382/103 |

\* cited by examiner

IMAGE SENSING APPARATUS, OBJECT DETECTING METHOD THEREOF AND NON-TRANSITORY COMPUTER READABLE RECORDING MEDIUM

CROSS-REFERENCE TO RELATED APPLICATION

This application claims priority from Korean Patent Application No. 10-2015-0105201, filed in the Korean Intellectual Property Office on Jul. 24, 2015, the disclosure of which is incorporated herein by reference in its entirety.

BACKGROUND

1. Field

Apparatuses and methods consistent with exemplary embodiments relate to an image sensing apparatus and an object detecting method thereof, and more particularly, to an image sensing apparatus which can more efficiently detect a user in a system that provides a service according to an existence or a position of a user and an object detecting method thereof.

2. Description of the Related Art

In a related art, a service is provided only when a user directly inputs a user command. However, demands for a function of actively providing a user with contents are recently increased. Accordingly, interests on technology of detecting a user are increasing.

The related art user detecting method based on images includes detecting a person from images collected from a camera by using an object-recognition algorithm and estimating a position of the recognized person by continuously chasing the person.

However, since the related art user detecting method based on images includes directly detecting a person from images, a high-quality camera is essential. In this case, according to qualities of images, performances of recognizing a person greatly vary and light also largely affects to the recognition performances.

Further, in the related art, since the object-recognition algorithm which needs a large amount of computation to recognize a person is used, a large amount of pixel computation is required. In addition, in order to chase a position of a person in real time, an object-chase algorithm should be applied in addition to the object-recognition algorithm. Therefore, relations of pixels between image frames should be continuously analyzed and it leads to an increase of computation.

Since, in order to provide an active service, an existence and a position of a user should be continuously determined, power is greatly consumed and a large amount of computation is required. Therefore, it is hard to apply the active service to a product.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments are related to an image sensing apparatus which can determine an existence and a position of a user by analyzing collected images with very little computation using a low power image sensor, and an object detecting method thereof.

According to an aspect of an exemplary embodiment, there is provided an apparatus which may include a sensing part configured to photograph an image, a storage configured to store a background image frame, and a controller configured to obtain a first difference image and a second difference image from the photographed image and determine an existence of an object and a position of the object using the first and the second difference images, wherein the first difference image can be an image indicating a difference between a currently photographed image frame and a previously photographed image frame, and the second difference image can be an image indicating a difference between the currently photographed image frame and the background image frame stored in the storage.

According to an aspect of an exemplary embodiment, there is provided an object detecting method of the apparatus which may include photographing an image(s), obtaining a first difference image and a second difference image from the photographed image(s) and determining an existence and a position of an object using the first and the second difference images, wherein the first difference image can be an image indicating a difference between a currently photographed image frame and a previously photographed image frame, and the second difference image can be an image indicating a difference between the currently photographed image frame and a pre-stored background image frame.

According to an aspect of another exemplary embodiment, there is provided a non-transitory computer readable recording medium including a program for operating an object detecting method of an apparatus which may include photographing an image(s), obtaining a first difference image and a second difference image from the photographed image(s), and determining an existence and a position of an object using the first and the second difference images, wherein the first difference image can be an image indicating a difference between a currently photographed image frame and a previously photographed image frame, and the second difference image can be an image indicating a difference between the currently photographed image frame and a pre-stored background image frame.

According to the various exemplary embodiments as described above, there is provided an image sensing apparatus determining an existence and a position of a user by analyzing collected images with very little computation using a low resolution image sensor. Also, there is provided an image sensing apparatus including detecting and chasing a user without operating an object-recognition which accompanies complicated computation and providing various user detecting contents by being connected to an external display apparatus.

BRIEF DESCRIPTION OF THE DRAWINGS

The above and/or other aspects will be more apparent by describing in detail exemplary embodiments with reference to the accompanying drawings, in which.

DETAILED DESCRIPTION OF THE EXEMPLARY EMBODIMENTS

Figure 1:
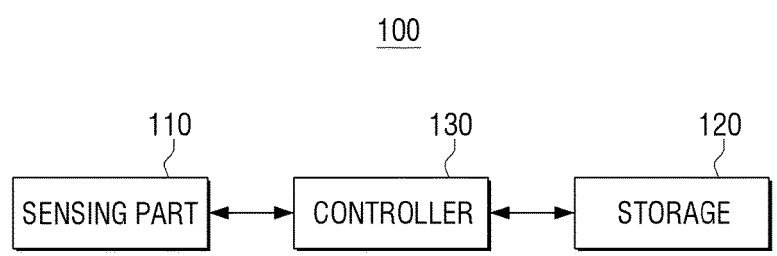
FIG. 1 is a block diagram illustrating a configuration of an image sensing apparatus according to an exemplary embodiment.

As the exemplary embodiments may be diversely modified, specific exemplary embodiments are illustrated in the drawings and described in detail in the written description. However, it is to be understood that this is not intended to limit the exemplary embodiments, but includes all modifications, equivalents, and substitutions without departing from the scope and spirit of the exemplary embodiments. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present specification are only used to describe the exemplary embodiments, but are not intended to limit the scope of the disclosure. The singular expression also includes the plural meaning as long as it does not differently mean in the context. In the present specification, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the exemplary embodiments will be described in detail with reference to the accompanying drawings. Like reference numerals in the drawings denote like elements, and redundant descriptions are omitted.

An image sensing apparatus 100 according to an exemplary embodiment can be embodied with a low specification image sensor and a low specification micro control unit (MCU). The image sensing apparatus 100 can continuously detect an appearance of a user in an area for photographing by using the image sensor which can operate with low power.

An image sensing apparatus 100 according to another exemplary embodiment can be used by being connected with a display apparatus such as a TV. The image sensing apparatus 100 can make the display apparatus to provide a service on the basis of user detection by detecting a user and transmitting a control signal (for example, an interrupt signal) to the display apparatus.

For example, there may be a service of displaying a user interface (UI) of providing greeting messages or various contents in response to an appearance of a user and a service that when a user vacates his/her seat in the middle of using a specific content or a service, the specific content or the service may be stopped for a short time by detecting an absence of the user, and when the user gets back to the seat, the specific content or the service may be continuously provided.

For another example, if the image sensing apparatus 100 transmits a control signal to the display apparatus, even though the display apparatus does not turn on the screen, the display apparatus can provide other elements with power in advance. Soon after, if the user operates a predetermined movement such as lifting a remote controller, the display apparatus can provide a service in a short time.

FIG. 1 is a block diagram illustrating a configuration of an image sensing apparatus 100 according to an exemplary embodiment. Referring to FIG. 1, the image sensing apparatus 100 may include a sensing part 110, a storage 120 and a controller 130.

The sensing part 110 can photograph an image(s). For example, the sensing part 110 can photograph a specific area for photographing all the time. By using a difference between photographed image frames, the image sensing apparatus 100 can detect that a change occurred in the area for photographing.

The sensing part 110 may include an image sensor, such as a charge coupled device (CCD) and a complementary metal oxide semiconductor (CMOS). The CCD is a device in which metal-oxide-silicon (MOS) capacitors are very close to each other and charge carriers are stored and transferred to the capacitors. The CMOS image sensor adopts a switching method that includes making MOS transistors as many as pixels by using technology of CMOS which uses a control circuit and a signal processing circuit as peripheral circuits and detecting outputs in order by using the MOS transistors.

The image sensing apparatus 100 according to an exemplary embodiment may include a low specification sensing part 110. For example, the sensing part 110 may be a CCD of very low resolution.

The image sensing apparatus 100 can use the CCD of very low resolution from which an image can be obtained with low power and analyze a photographed image with very little computation. Through this, the effect of determining an existence and a position of a user with low power and low cost can be obtained.

The storage 120 can store a photographed image(s) and a background image frame(s). The background image indicates an image that a user or an object does not exist in an area for photographing that the image sensing apparatus 100 photographs.

The storage 120 can classify images photographed by the sensing part 110 and transitorily store the images. The storage 120 can store a difference image obtained from a controller 130 which will be described later. In another exemplary embodiment, the function of the storage 120 can be operated by a buffer included in the controller 130.

The controller 130 may control a general configuration of the image sensing apparatus 100. For example, if it is determined that a background image is changed, the controller 130 can update the background image frame and store the background image frame in the storage 120. Detailed operations of the controller 130 will be described in below.

Figure 2:
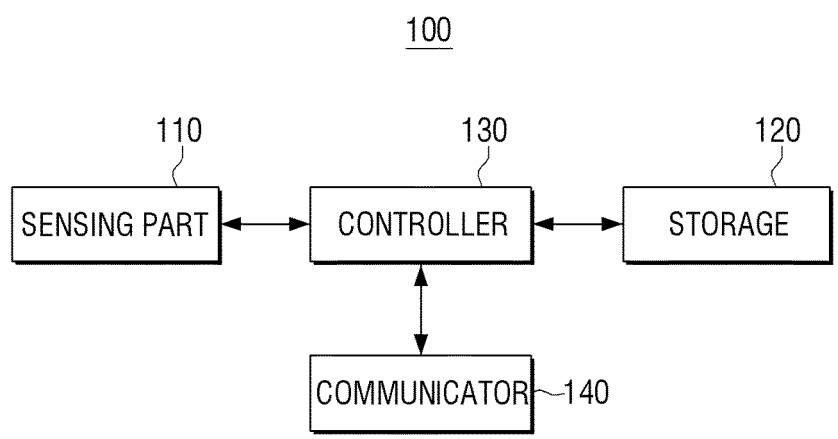
FIG. 2 is a block diagram illustrating a configuration of an image sensing apparatus according to another exemplary embodiment.

FIG. 2 is a block diagram illustrating a configuration of the image sensing apparatus 100 according to another exemplary embodiment. When comparing to the exemplary embodiment illustrated in FIG. 1, a communicator 140 can be further included.

The communicator 140 operates transceiving with an external apparatus according to various kinds of communication methods. If it is determined that an object exists in a photographed image, the controller 130 can control the communicator 140 to transmit a control signal to the external apparatus.

The communicator 140 can include various communication chips that support wired and wireless communications.

For example, the communicator 140 can include chips which operate in manner of wired LAN (Local Area Network), wireless LAN, WiFi, Bluetooth (BT) or near field communication (NFC). In case of BT connection, after the communicator 140 transceives various pieces of connection information such as a SSID and a session key with an external apparatus and a connection of the communicator 140 and the external apparatus is completed, the communicator 140 can transceive pieces of information including a control command.

The controller 130 can obtain a difference image from images photographed from the sensing part 110. The controller 130 can determine an existence and a position of an object by using the obtained difference image. According to an exemplary embodiment, there can be two kinds of difference images. A first difference image may be an image indicating a difference between a currently photographed image frame and a previously photographed image frame.

For example, if image frames are photographed at 1 second interval, a first difference image may be an image indicating a difference between an image frame photographed at t second and an image frame photographed at t−1 second. A second difference image may be an image indicating a difference between a currently photographed image frame and a background image frame. The background image frame can be stored in the storage 120.

The controller 130 can obtain a difference image with resolution lower than resolution of a photographed image. For example, when a photographed image has resolution of m×n, the controller 130 can obtain a difference image having resolution of m'×n' (m'<m, n'<n) by marking the photographed image off to a certain size of area.

The controller 130 can compare a difference between target frames to a predetermined threshold value and obtain a difference image as a binary image. This is to reduce noise which can be generated by image difference.

For example, the controller 130 can display image frames in grey scale (0~255) and compare a difference of grey scale value to a predetermined threshold value. The controller 130, if the difference is same as or greater than the predetermined threshold value, determines the difference as "true" (1) and, if the difference is less than the predetermined threshold value, determines the difference as "false" (0).

For example, if a true area exists in a first difference image, the controller 130 can determine that an object exists. The controller 130 can determine a position of the true area as a position of the object. Since the first difference image indicates a difference between image frames photographed at t second and t t−1 second, an existence of the true area in the first difference image can be interpreted as a case in which an object (for example, a user) is newly appeared.

If a true area exists in a first difference image but a true area does not exist in a second difference image, the controller 130 can classify whether an object exists or a background image is changed according to a position of the true area.

For example, if a difference between a position of a true area which used to exist in a previous first difference image and a position of a true area of a current second difference image is less than a predetermined value, the controller 130 can determine that an object with no movement exists. For example, a person enters an area for photographing and sits at a certain place.

If a difference between a position of a true area which used to exist in a previous first difference image and a position of a true area of a current second difference image is same as or greater than a predetermined value, the controller 130 can determine that a background is changed.

If a true area does not exist in a first difference image but a true area exists in a second difference image maintains longer than a predetermined time, the controller 130 can determine that a background image is changed regardless whether a difference between a position of a true area which used to exist in a previous first difference image and a position of a true area of a current second difference image is same as or greater than, or less than the predetermined value.

If it is determined that an object exists, the controller 130 can provide a service based on a detection of the object. For example, if it is determined that an object exists, the controller 130 can control the communicator 140 to transmit a control signal to an external apparatus. The controller 130 can transmit an interrupt signal to a display apparatus and carry out an operation(s) related to a power supply of the display apparatus.

If it is determined that a background image is changed, the controller 130 can update a background image frame. For example, if the background image is changed and no movement occurs for a predetermined time (a true area occurs in a first difference image), the controller 130 can update the background image frame.

Hereinafter, by referring to FIGS. 3 to 5B, the image sensing apparatus 100 detecting an object is described in detail.

Figure 3:
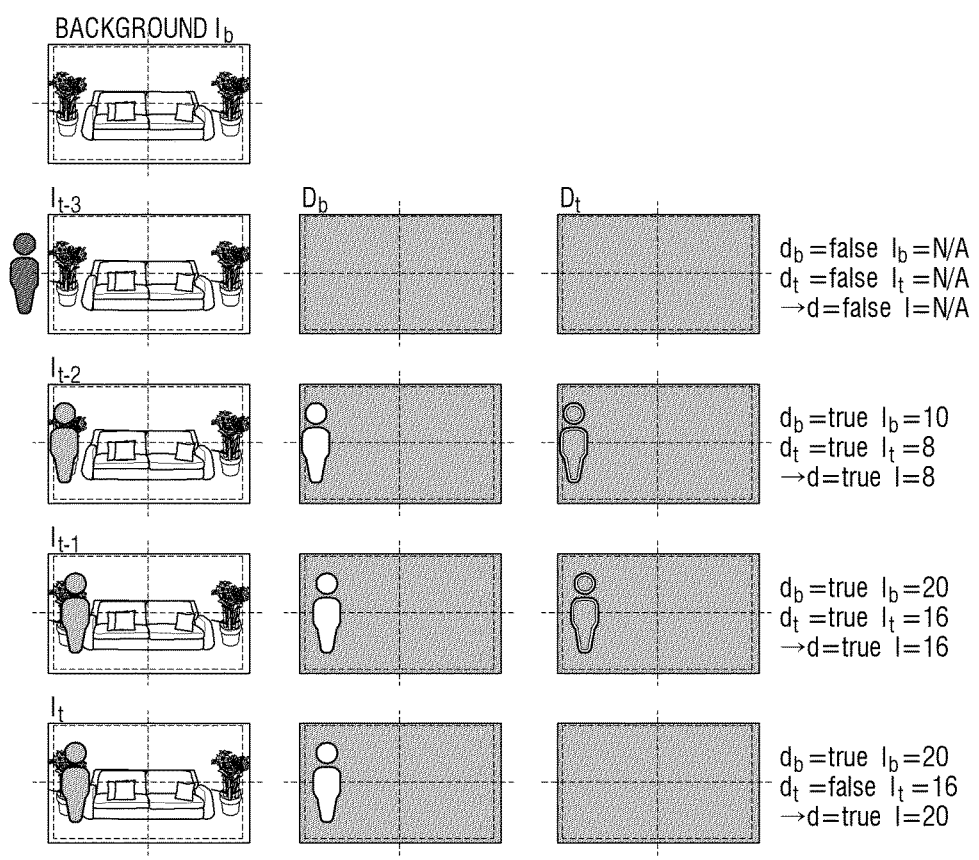
FIG. 3 is a view for explaining a case in which a user appears in a area for photographing and the user does not move at a certain position.

FIG. 3 is a view illustrating a case in which a user (an object) appears in an area for photographing and the user does not move at a certain position. In FIG. 3, Ib indicates a background image frame, It indicates an image frame at t second, Dt indicates a first difference image and Db indicates a second difference image. Also, d (dt, db) indicates whether an object is detected and l (lt, lb) indicates a position of an object.

In FIG. 3, since a user did not appear in an area for photographing at time of t−3, it is determined that a true area does not exist (d=false) in both of a first difference image (Dt) in which the image frame at time of t−3 is compared to a previous image frame and a second difference image (Db) in which the image frame at time of t−3 is compared to a background image frame (Ib).

At time of t−2, a user appears in the area for photographing. An area that the user positioned in an image frame photographed at t−2 is determined as a true area both in the first and second difference images. Since a movement difference in the first difference image is not big, only an edge area of an object is determined as a true area. Since it is determined that the true area exists in the first difference image, the controller 130 can determine that the object exists. In addition, the controller 130 can determine a position of the true area (lt) in the first difference image as a position of the object (l).

Since there is a movement of the user in the area for photographing at time of t−1, like at time of t−2, it is determined that a true area exists in a first difference image.

Therefore, the controller 130 determines that an object exists and determines a position of the true area in the first difference image as a position of the object.

At time of t, comparing to time of t−1, the user did not move. Therefore, it is determined that a true area does not exist in a first difference image. Since a second difference image shows comparison of an image frame photographed at time of t and a background image frame, it is determined that a true area exists in the second difference image. Since a difference between a position of the true area (lb) in the second difference image at time of t and a position of the true area (lt) of the first difference image at time of t−1 is less than a predetermined value, the controller 130 can determine that an object exists. Also, the controller 130 can determine the position of the true area (lb) in the second difference image as a position of the object (l).

In determining a position of an object, if a true area exists in a first difference image, the controller 130 can determine a position of the true area in the first difference image as a position of the object. If a true area does not exist in a first difference image but an object exists, the controller 130 can determine a position of a true area in a second difference image as a position of an object.

Figure 4:
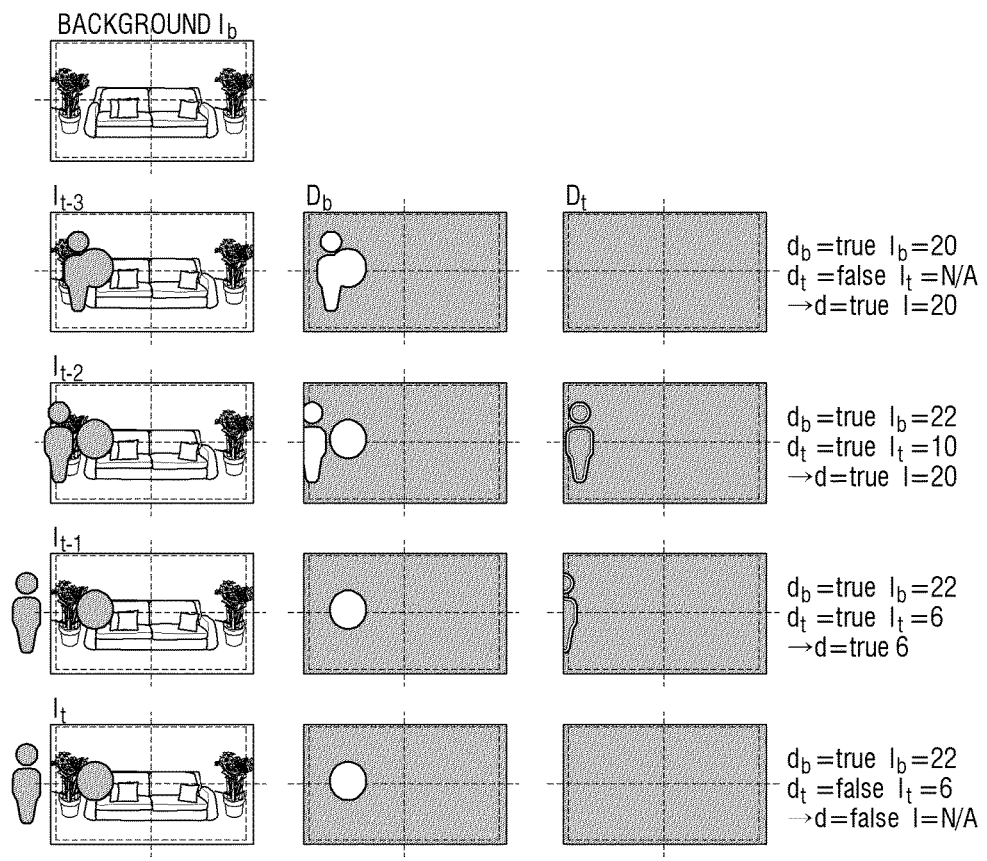
FIG. 4 is a view for explaining a case in which a user with an object appears in an area for photographing and the user exits while leaving the object.

FIG. 4 is a view illustrating a case in which a user with a round object appears and exits from an area for photographing while leaving the round object. The image sensing apparatus 100 can detect a user as an object but detect the round object as a change in a background.

In FIG. 4, at time of t−3, a user with a round object appears in an area for photographing. Since there is no photographed frame before time of t−3, it is determined that a true area does not exist in a first difference image and a true area exists in a second difference image, and the controller 130 can determine a position of an object as a position of the true area in the second difference image.

At time of t−2, the user starts to get out from the area for photographing while leaving the round object on a couch. Due to a movement of the user, a true area same as a shape of the user exists in a first difference image. Since the true area exists in the first difference image, the controller 130 can determine that an object exists. Also, the controller 130 can determine a position of the true area of the first difference image as a position of the object. Time of t−1 can be determined just like time of t−2.

At time of t, a true area does not exist in a first difference image. However, a true area exists at a position of a round object in a second difference image. The controller 130 compares a difference between a position of a true area in the first difference image at time of t−1 and a position of the true area in the second difference image at time of t to a predetermined value. At this time, since the difference of positions which is same as or greater than the predetermined value occurred, the controller 130 can determine that a change occurred in the background image.

Figure 5A:
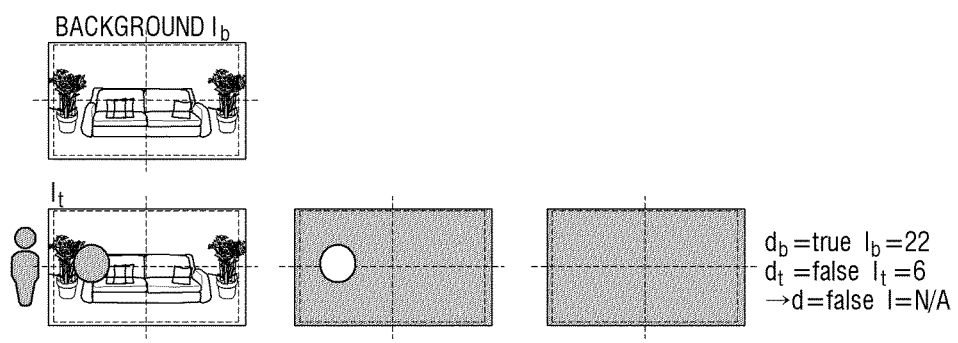
FIGS. 5A and 5B are views for explaining a case in which a background is updated by an object which is not used to exist on an original background or an object whose position was changed.
Figure 5B:
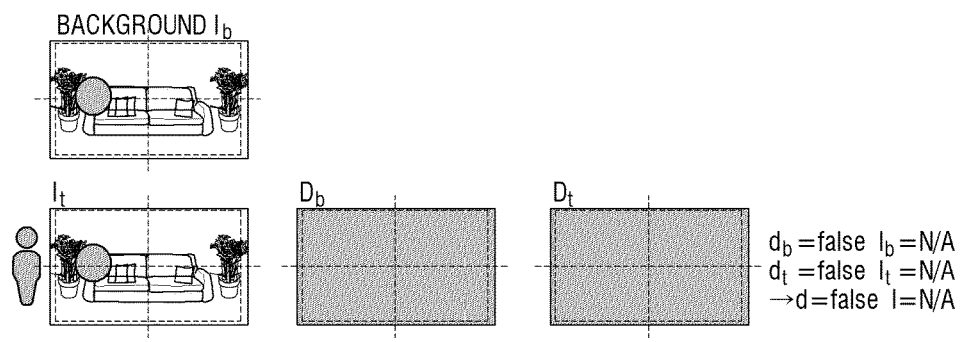

FIGS. 5A and 5B are views illustrating, when it is determined that a change occurred in a background image, updating the background image.

FIG. 5A is a view illustrating a case identical to time of t of FIG. 4. Therefore, the controller 130 can determine that a change occurred in a background image.

As shown in FIG. 5A, after it is determined that a change occurred in a background image, if a true area does not occur in a first difference image for a predetermined time, the controller 130 can update the background image. FIG. 5B is a view illustrating after the background image is updated.

The image sensing apparatus according to the above-described various exemplary embodiments can determine an existence and a position of a user by analyzing collected images using an image sensor of low resolution with very little computation. Also, a function of detecting a user who does not move may be provided.

Figure 6:
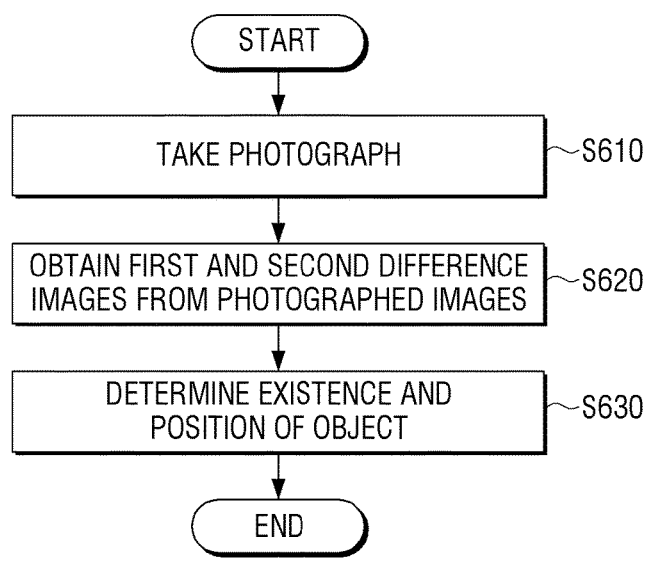
FIGS. 6 and 7 are flowcharts for explaining an object detecting method of an image sensing apparatus according to various exemplary embodiments.
Figure 7:
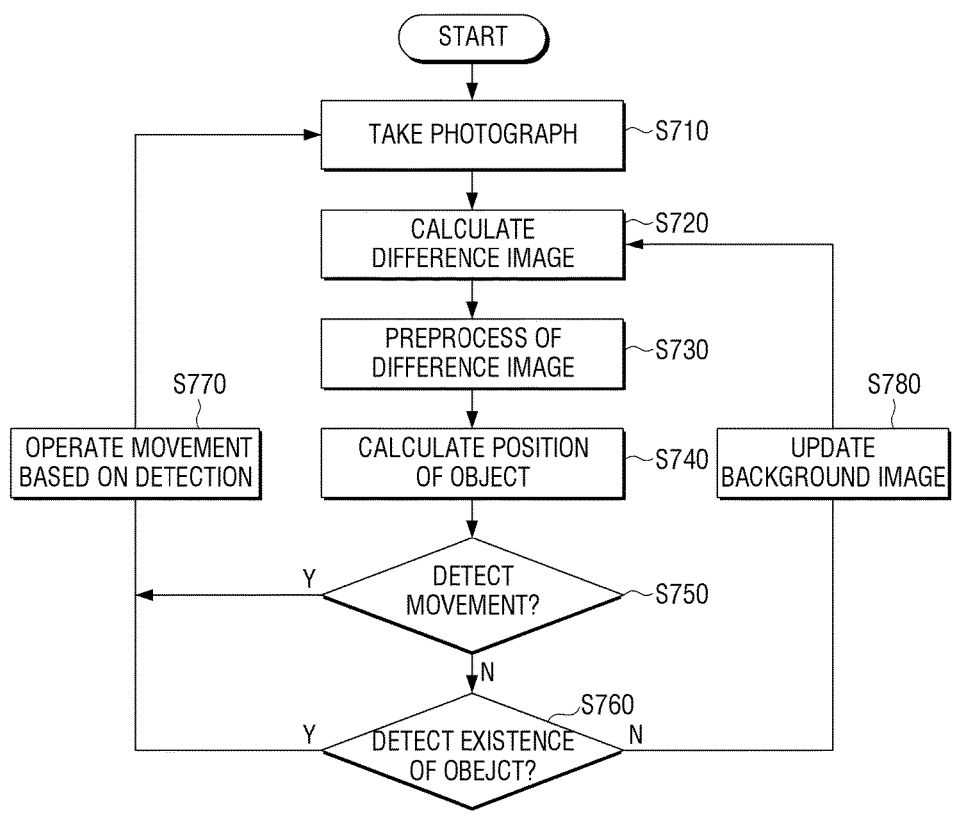

FIGS. 6 and 7 are flowcharts explaining object detecting methods of the image sensing apparatus 100 according to various exemplary embodiments.

Referring to FIG. 6, the image sensing apparatus 100 photographs an image(s) (S610). The image sensing apparatus 100 can store the photographed image(s) frame by frame. And then, the image sensing apparatus 100 can obtain a first difference image and a second difference image by using the photographed image and a background image (S620). The first difference image is an image in which a difference between a currently photographed image frame and a previously photographed image frame is calculated. The second difference image is an image in which a difference between the currently photographed image frame and a pre-stored background image frame is calculated.

In obtaining the first difference image, the image sensing apparatus 100, by comparing a difference between the currently photographed image frame and the previously photographed image frame to a predetermined threshold value, can obtain the first difference image as a binary image. For example, the image sensing apparatus 100 can compare a difference of grey scale values of pixels of which positions are corresponding to an image frame(s). Likewise, when obtaining the second difference image, the image sensing apparatus 100, by comparing a difference between the currently photographed image frame and the background image frame to the predetermined threshold value, can obtain the second difference image as a binary image.

For example, the image sensing apparatus 100 can obtain a difference image with resolution lower than resolution of a photographed image.

The image sensing apparatus 100 can determine an existence and a position of an object by using a first difference image and a second difference image (S630). For example, if a true area exists in a first difference image, the image sensing apparatus 100 can determine that an object exists, and determine the true area in the first difference image as a position of the object.

If a true area does not exist in a first difference image but a true area exists in a second difference image, the image sensing apparatus 100, by comparing a difference between a position of a true area which used to exist in a previous first difference image and a position of the true area of the second difference image to a predetermined value, can determine an existence of an object. If the difference between the true areas is less than the predetermined value, the image sensing apparatus 100 can determine that the object exists, and determine the position of the true area of the second difference image as a position of the object. On the other hand, if the difference of the positions of the true areas is same as or greater than the predetermined value, the image sensing apparatus 100 can determine that a background image is changed.

Referring to FIG. 7, the image sensing apparatus 100 photographs an image(s) of an area for photographing (S710).

After then, the image sensing apparatus 100 calculates a difference image using the photographed image frame and a pre-stored background image frame. As described above, the image sensing apparatus 100, by calculating a difference between a currently photographed image frame and a previously photographed image frame and a difference between the currently photographed image frame and a pre-stored background image frame, can obtain a first and a second difference images.

The image sensing apparatus 100, after preprocesses such as the noise reduction and the above-described binary image generation, generates a first difference image and a second difference image (S730). The image sensing apparatus 100 calculates a position of an object in the first difference image and the second difference image. The image sensing apparatus 100 can calculate a position of a true area in each difference image as a position of the object (S740).

The image sensing apparatus 100 determines whether a movement of the object is detected (S750). For example, if a position of an object is calculated in a first difference image, the image sensing apparatus 100 can determine that a movement is detected (S750-Y). If a movement is not detected (S750-N), the image sensing apparatus 100 determines whether the object is left (S760). If a difference between a position of a finally determined object in the first difference image and a position of an object in the second difference image is less than a predetermined value, the image sensing apparatus 100 determines that the object exists (S760-Y). On the other hand, if the difference is same as or greater than the predetermined value, the image sensing apparatus 100 determines that a background image is changed (S760-N).

If the image sensing apparatus 100 detects a movement of the object (S750-Y) or determines that the object exists in the area for photographing (S760-Y), the image sensing apparatus 100 can operate a movement based on a detection of the object (S770). For example, the image sensing apparatus 100 can transmit a control signal to an external apparatus. The control signal may be an interrupt signal related to a power supply of a display apparatus.

On the other hand, if it is determined that a background is changed (S760-N), the image sensing apparatus 100 can update the background image (S780).

Through the object detecting method according to the above-described various exemplary embodiments, even when an external display apparatus is turned off, the image sensing apparatus 100 connected to the display apparatus can detect an existence and a position of a user and immediately provide various services to the user.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

While the exemplary embodiments have been illustrated and described, it will be understood by those skilled in the art that various changes in form and details may be made therein without departing from the spirit and scope of the exemplary embodiments as defined by the appended claims.

What is claimed is:

1. An apparatus comprising:
  a sensor configured to photograph a current image frame;
  a memory configured to store a background image frame; and
  a processor configured to obtain a first difference image and a second difference image from the currently photographed image frame, to identify an existence of an object and a position of the object using the first and the second difference images,
  wherein the processor is further configured to obtain the first difference image by comparing a difference between corresponding grey scale values of the currently photographed image frame and a previously photographed image frame with a threshold value,
  wherein the processor is further configured to obtain the second difference image by comparing a difference between corresponding grey scale values of the currently photographed image frame and the background image frame stored in the memory with the threshold value,
  wherein the processor is further configured to, if a first condition and a second condition are satisfied, update the background image frame to the currently photographed image frame,
  wherein the first condition is a condition that an area representing a pixel difference between frames does not exist in the first difference image but exists in the second difference image, and
  wherein the second condition is a condition that a difference in the area between a previously-obtained first difference image corresponding to the previously photographed image frame and the second difference image corresponding to the currently photographed image frame is equal to or greater than a predetermined value.

2. The apparatus as claimed in claim 1, further comprising:
  a transceiver configured to communicate with an external apparatus,
  wherein the processor, in response to identifying that the object exists, is further configured to control the transceiver to transmit a control signal to the external apparatus.

3. The apparatus as claimed in claim 2, wherein the control signal includes an interrupt signal related to a power supply of the external apparatus.

4. The apparatus as claimed in claim 1, wherein the processor is further configured to obtain the first and the second difference images as binary images.

5. The apparatus as claimed in claim 4, wherein the processor, in response to an existence of a true area in the first difference image, is further configured to identify that the object exists and identify a position of the true area as the position of the object.

6. The apparatus as claimed in claim 4, wherein the processor, in response to identifying that a true area does not exist in the first difference image but exists in the second difference image, if a difference between a position of a true area which used to exist in the previously-obtained first difference image and a position of a true area of the second difference image is less than the predetermined value, is further configured to identify that the object exists.

7. The apparatus as claimed in claim 6, wherein the processor, in response to determining that a case in which a true area does not exist in the first difference image but does exist in the second difference image is maintained longer than a predetermined time, is further configured to determine that the background image frame is changed regardless of the difference in position.

8. The apparatus as claimed in claim 1, wherein the processor is further configured to obtain the first and the second difference images with resolution which is lower than resolution of the currently photographed image frame.

9. A method of detecting an object of an apparatus, the method comprising:
photographing a current image frame;
obtaining a first difference image and a second difference image the currently photographed image frame; and
identifying an existence of an object and a position of the object using the first and the second difference images,
wherein the obtaining comprises obtaining the first difference image by comparing a difference between corresponding grey scale values of the currently photographed image frame and a previously photographed image frame with a threshold value,
wherein the obtaining comprises obtaining the second difference image by comparing a difference between corresponding grey scale values of the currently photographed image frame and a background image frame that is pre-stored with the threshold value,
wherein the method further comprises updating the background image frame to the currently photographed image frame if a first condition and a second condition are satisfied,
wherein the first condition is a condition that an area representing a pixel difference between frames does not exist in the first difference image but exists in the second difference image, and
wherein the second condition is a condition that a difference in the area between a previously-obtained first difference image corresponding to the previously photographed image frame and the second difference image corresponding to the currently photographed image frame is equal to or greater than a predetermined value.

10. The method as claimed in claim 9, further comprising:
transmitting a control signal to an external apparatus in response to identifying the existence of the object.

11. The method as claimed in claim 10, wherein the control signal includes an interrupt signal related to a power supply of the external apparatus.

12. The method as claimed in claim 9, wherein the obtaining the first and second difference images comprises obtaining the first and the second difference images as binary images.

13. The method as claimed in claim 12, wherein the identifying the existence and the position of the object comprises identifying, in response to an existence of a true area in the first difference image, that the object exists and identifying a position of the true area as the position of the object.

14. The method as claimed in claim 12, wherein the identifying the existence and the position of the object comprises, in response to determining that a true area does not exist in the first difference image but exists in the second difference image, if a difference between a position of a true area which used to exist in the previously-obtained first difference image and a position of a true area of the second difference image is less than the predetermined value, identifying that the object exists.

15. The method as claimed in claim 14, wherein the determining the existence and the position of the object comprises, in response to determining that a case in which a true area does not exist in the first difference image but does exist in the second difference image is maintained longer than a predetermined time, determining that the background image frame is changed regardless of the difference in position.

16. The method as claimed in claim 9, wherein the obtaining the first and the second difference images comprises obtaining the first and second difference images with resolution which is lower than resolution of the currently photographed image frame.

17. A non-transitory computer readable recording medium comprising a program of operating a method of detecting an object of an apparatus, the method comprising:
photographing a current image frame;
obtaining a first difference image and a second difference image from the currently photographed image frame;
identifying an existence of an object and a position of the object using the first and the second difference images,
wherein the obtaining comprises obtaining the first difference image by comparing a difference between corresponding grey scale values of the currently photographed image frame and a previously photographed image frame with a threshold value, and
wherein the obtaining comprises obtaining the second difference image by comparing a difference between corresponding grey scale values of the currently photographed image frame and background image frame that is pre-stored with the threshold value,
wherein the method further comprises updating the background image frame to the currently photographed image frame if a first condition and a second condition are satisfied,
wherein the first condition is a condition that an area representing a pixel difference between frames does not exist in the first difference image but exists in the second difference image, and
wherein the second condition is a condition that a difference in the area between a previously-obtained first difference image corresponding to the previously photographed image frame and the second difference image corresponding to the currently photographed image frame is equal to or greater than a predetermined value.

* * * * *